United States Patent
Brennan et al.

(10) Patent No.: US 7,076,047 B1
(45) Date of Patent: Jul. 11, 2006

(54) METHOD AND APPARATUS FOR DETERMINING THE CARRIER USED FOR AN AIN CALL

(75) Inventors: Stephen Paul Brennan, Bedford, TX (US); James Ralph Bradford, Odessa, FL (US)

(73) Assignee: Verizon Corporate Services Group Inc., New York, NY (US)

( * ) Notice: Subject to any disclaimer, the term of this patent is extended or adjusted under 35 U.S.C. 154(b) by 1103 days.

(21) Appl. No.: 09/654,444

(22) Filed: Sep. 1, 2000

(51) Int. Cl.
*H04M 7/00* (2006.01)
*H04M 3/00* (2006.01)

(52) U.S. Cl. .......... 379/219; 379/220.01; 379/221.01; 379/221.02; 379/221.05; 379/243

(58) Field of Classification Search .......... 379/220.01, 379/221.02, 221.01, 221.05, 243, 219
See application file for complete search history.

(56) References Cited

U.S. PATENT DOCUMENTS

| | | | |
|---|---|---|---|
| 5,550,912 A | * | 8/1996 | Akinpelu et al. ........... 379/221 |
| 5,781,620 A | * | 7/1998 | Montgomery et al. ...... 379/115 |
| 6,205,214 B1 | * | 3/2001 | Culli et al. ................. 379/220 |

\* cited by examiner

*Primary Examiner*—Ahmad F. Matar
*Assistant Examiner*—Thjuan P. Knowlin
(74) *Attorney, Agent, or Firm*—Leonard C. Suchtya, Esq.; Joel Wall, Esq.

(57) ABSTRACT

The present invention provides a method for determining the carrier that should be used for a particular AIN call. The following information is derived for each call: the originating calling party number, the terminating called party number, the originating LATA, the terminating LATA. Using these components, pre-defined tables are accessed that contain local calling plan information. These tables contain rate center and dial plan information that provides the local calling scope that is available to the originator of the call. Based on the information contained in the tables, the appropriate type of carrier for the call is selected and the call is routed using this carrier.

24 Claims, 4 Drawing Sheets

FIGURE 1

FIGURE 2
CGTES.0143

LATA TABLE

| LATA (key) | NPA-NXX Or NPA-NXX-X (key) | Rate Center | Dial Plan | COC | OCN |
|---|---|---|---|---|---|
| 552 | 817244 | FORTWORTH | | EOC | 9533 |
| 552 | 817245 | FORTWORTH | | EOC | 9533 |
| 552 | 817246 | FORTWORTH | | EOC | 9533 |
| 552 | 817247 | ARLINGTON | | PMC | 6010 |
| 552 | 817249 | FORTWORTH | | EOC | 9533 |
| 552 | 817251 | GRAPEVINE | | EOC | 4344 |
| 552 | 817252 | FORTWORTH | | EOC | 9533 |
| 552 | 817253 | GLENDALE | | PMC | 6671 |
| 552 | 817255 | FORTWORTH | | EOC | 9533 |
| 552 | 817256 | FORTWORTH | | EOC | 8516 |
| 552 | 817257 | FORTWORTH | | EOC | 9533 |
| 552 | 817258 | FORTWORTH | | EOC | 9533 |
| 552 | 817259 | ARLINGTON | | EOC | 7715 |
| 552 | 817260 | ARLINGTON | | EOC | 7715 |
| 552 | 817261 | ARLINGTON | EMS | EOC | 9533 |
| 552 | 817262 | ARLINGTON | EMS | EOC | 9533 |
| 552 | 817263 | FORTWORTH | | EOC | 9533 |
| 552 | 817264 | ARLINGTON | EMS | EOC | 9533 |
| 552 | 817265 | ARLINGTON | EMS | EOC | 9533 |
| 552 | 817266 | GLENDALE | | PMC | 6671 |
| 552 | 817267 | EULESS | EMS | EOC | 9533 |
| 552 | 817268 | EULESS | EMS | EOC | 9533 |
| 552 | 817269 | GLENDALE | | PMC | 6671 |
| 552 | 817270 | AZLE | | EOC | 4344 |
| 552 | 817271 | ARLINGTON | | PMC | 6010 |
| 552 | 817272 | ARLINGTON | EMS | EOC | 9533 |
| 552 | 817273 | ARLINGTON | EMS | EOC | 9533 |
| 552 | 817274 | ARLINGTON | | EOC | 9533 |
| 552 | 817275 | ARLINGTON | | EOC | 9533 |
| 552 | 817276 | ARLINGTON | | EOC | 9533 |
| 552 | 817277 | ARLINGTON | | EOC | 9533 |
| 552 | 817278 | FORTWORTH | | EOC | 9533 |
| 552 | 817279 | GRANBURY | EMS | EOC | 9533 |
| 552 | 817280 | EULESS | | EOC | 9533 |
| 552 | 817281 | NRICHLDHLS | | EOC | 9533 |
| 552 | 817282 | EULESS | | EOC | 9533 |
| 552 | 817283 | EULESS | | EOC | 9533 |
| 552 | 817284 | ATLAS | | EOC | 9533 |
| 552 | 817285 | EULESS | | EOC | 9533 |
| 552 | 817287 | ARLINGTON | | EOC | 7263 |
| 552 | 817288 | FORTWORTH | | EOC | 7263 |
| 552 | 817291 | ARLINGTON | | PMC | 6010 |
| 552 | 817292 | FORTWORTH | | EOC | 9533 |
| 552 | 817293 | FORTWORTH | | EOC | 9533 |
| 552 | 817294 | FORTWORTH | | EOC | 9533 |
| 552 | 817295 | FORTWORTH | | EOC | 9533 |
| 552 | 817296 | ARLINGTON | | PMC | 6010 |
| 552 | 817297 | FORTWORTH | | EOC | 9533 |
| 552 | 817300 | ARLINGTON | | PMC | 6664 |
| 552 | 817301 | ARLINGTON | | EOC | 7670 |
| 552 | 817302 | FORTWORTH | | EOC | 7249 |
| 552 | 817304 | WEATHERFD | | PMC | 6010 |
| 552 | 817305 | GRAPEVINE | | EOC | 7758 |
| 552 | 817306 | FORTWORTH | | EOC | 9533 |
| 552 | 817307 | ARLINGTON | | PMC | 6010 |
| 552 | 817308 | ARLINGTON | | PMC | 6010 |

FIGURE 3

ORIGINATING RATE CENTER TABLE

| LATA (key) | Originating Rate Center (key) | Terminating Rate Center | Dial Plan | Optional Plan 1 | Optional Plan 2 | Optional Plan 3 | Optional Plan 4 |
|---|---|---|---|---|---|---|---|
| 552 | DLFTWTARPT | WEATHERFORD | EMS | | | | |
| 552 | GRAPEVINE | ALLEN | | | | | |
| 552 | GRAPEVINE | ALVARADO | EMS | | | | |
| 552 | GRAPEVINE | ARGYLE | EMS | | | | |
| 552 | GRAPEVINE | ARLINGTON | EMS | | | | |
| 552 | GRAPEVINE | AZLE | | | | | |
| 552 | GRAPEVINE | CADDOMILLS | | | | | |
| 552 | GRAPEVINE | CARROLLTON | | | | | |
| 552 | GRAPEVINE | CEDAR HILL | EMS | | | | |
| 552 | GRAPEVINE | CLEBURNE | EMS | | | | |
| 552 | GRAPEVINE | DALLAS | | | | | |
| 552 | GRAPEVINE | DENTON | EMS | | | | |
| 552 | GRAPEVINE | DESOTO | | | | | |
| 552 | GRAPEVINE | DLFTWTARPT | | | | | |
| 552 | GRAPEVINE | EULESS | EMS | | | | |
| 552 | GRAPEVINE | FT.WORTH | | | | | |
| 552 | GRAPEVINE | GRANBURY | EMS | | | | |
| 552 | GRAPEVINE | GRANDPRARI | EMS | | | | |
| 552 | GRAPEVINE | IRVING | EMS | | | | |
| 552 | GRAPEVINE | JUSTIN | EMS | | | | |
| 552 | GRAPEVINE | KELLER | | | | | |
| 552 | GRAPEVINE | KENNEDALE | EMS | | | | |
| 552 | GRAPEVINE | LEWISVILLE | EMS | | | | |
| 552 | GRAPEVINE | MANSFIELD | | | | | |
| 552 | GRAPEVINE | N.RICHLAND HILLS | EMS | | | | |
| 552 | GRAPEVINE | PLANO | EMS | | | | |
| 552 | GRAPEVINE | RENO | EMS | | | | |
| 552 | GRAPEVINE | ROANOKE | | | | | |
| 552 | GRAPEVINE | ROCKWALL | | | | | |
| 552 | GRAPEVINE | SEAGOVILLE | | | | | |
| 552 | GRAPEVINE | SPRINGTOWN | EMS | | | | |
| 552 | GRAPEVINE | WEATHERFORD | EMS | | | | |
| 552 | IRVING | ALLEN | | | | | |

FIGURE 4

METHOD AND APPARATUS FOR DETERMINING THE CARRIER USED FOR AN AIN CALL

BACKGROUND OF THE INVENTION

1. Technical Field

The present invention relates to telecommunication services, and more particularly to a method and apparatus for routing an advanced intelligence network call to the appropriate carrier for call completion.

2. Description of the Related Art

In recent years, a number of new service features have been provided by an enhanced telephone network which has come to be called an Advanced Intelligent Network (AIN). In an AIN type system, local and/or toll offices of the public telephone network can detect one of a number of call processing events which are identified as AIN "triggers." For an ordinary telephone service call there is no event that triggers AIN processing, and the local and toll office switches would function normally and process such calls without referring to the AIN database for instructions. When a central office detects a trigger, the call is suspended and a call data message is forwarded via a common channel inter-office signaling (CCIS) link to a service control point which includes a multi-services application platform (MSAP) database. If additional information is needed, the Service Control Point (SCP) can instruct the central office to obtain and forward additional information. Once sufficient information regarding the call has reached the SCP, the SCP accesses its stored data tables in the MSAP database to translate the received call data message into a call control message and then return the call control message to the central office via the CCIS link. The central office then uses the call control message to complete the particular call.

Recently, legislative and regulatory changes require the local exchange carrier (LEC) to unbundle certain network elements and services and offer use of those elements and services to other carriers for resale to end users. These changes have resulted in the necessity for more complex routing of telephone calls because more than one carrier can provide local and long distance service in any given geographic area. The introduction of multiple carriers into this market has resulted in greater complexity for AIN service logic programs in determining how an AIN call should be routed. The current AIN service logic does not have means for determining whether a call should be routed by the LEC, the IntraLATA carrier (LATA means Local Access and Transport Area) or the InterLATA carrier. This has resulted in customer complaints regarding erroneous billing for calls that were misrouted using current methods. Thus, there is a need for a method and apparatus for determining whether the carrier that is required for a particular AIN is the local exchange carrier (LEC), the IntraLATA carrier, or the InterLATA carrier.

SUMMARY OF THE INVENTION

An embodiment of the present invention provides a method for determining the carrier that should be used for a particular AIN call. The following information is derived for each call: the originating calling party number, the terminating called party number, the originating LATA, and the terminating LATA. Using these components, pre-defined tables are accessed that contain local calling plan information. These tables contain rate center and dial plan information that provides the local calling scope that is available to the originator of the call. Based on the information contained in the tables, the appropriate type of carrier for the call is selected and the call is routed using this carrier.

Other embodiments of the present invention relate to a system or a method for selecting a carrier type for routing a call. Such system or method determines whether a called party is inside a local calling scope of a calling party, and, if so, selects a first carrier as the carrier type. But, if not, then the system or method selects a second carrier as the carrier type if both an originating LATA and a terminating LATA of the calling party are the same. The system or method selects a third carrier as the carrier type if the originating LATA and terminating LATA are different.

Yet another embodiment of the present invention relates to a computer readable medium containing a data structure through which the aforesaid system or method may be manifested.

It is, therefore, a general objective of the present invention to provide a method and apparatus for determining the carrier used for an AIN call.

BRIEF DESCRIPTION OF THE DRAWINGS

FIG. 3 is a hypothetical LATA Table in accordance with an embodiment of the invention.

DETAILED DESCRIPTION

Advanced Intelligent Network (AIN) services are becoming more and more popular. To process an AIN call, the AIN service logic programs (SLP) must be able to determine when a call should be routed using LEC facilities, IntraLATA facilities or InterLATA facilities. The AIN-equipped Central office CO is also commonly referred to as a service switching point (SSP). SSPs are appropriately equipped programmable switches present in the telephone network which recognize AIN type calls, launch queries to the AIN Service Control Point (SCP) and receive commands and data from the AIN SCP to further process the AIN calls. Various triggers may be programmed into the SSP which perform a query to the SCP when an AIN call is made. When the SCP receives a query, the AIN service logic program (SLP) is invoked for the particular service associated with the trigger that caused the query. Once the processing associated with that particular AIN service is complete, the SLP instructs the SSP to provide call termination information and to complete the call. The SSP then completes the AIN call.

Because the caller or "originator" of an AIN call may not necessarily be a local caller due to the fact that AIN calls are not routed like a normal call, the SLP contains special logic that determines the local calling scope of the caller. Using this information, the SLP determines which type of carrier is the appropriate carrier for the call. The special logic detects the appropriate carrier for the call by referring to tables that identify the rate center according to the first six digits of the telephone number. For instance, the first six digits, e.g. 972-718 (the NPA-NXX combination) for the telephone number 972-718-9999, indicate which telephone company's franchise and the central office that serve the calling party. However, the first seven digits, e.g. 972-718-9 (the NPA-NXX-X combination), of the telephone number may be required where 1K Number Pooling is being used. 1K Number Pooling is simply a means for transferring telephone numbers to another telephone company franchise or central office within the same rate center. For example, all of the numbers beginning with 972-718-9 could be assigned to telephone company franchise A, and all of the other numbers beginning with 972-718 could be assigned to telephone company franchise B. Each NPA-NXX (or NPA-NXX-X as the case may be) combination within a Local Access and Transport Area (LATA) are defined in tables referred to herein as LATA tables. The LATA tables may be stored in the MSAP database. The rate center assigned to each NPA-NXX or NPA-NXX-X (when applicable) is defined in the LATA table which is described in greater detail in reference to FIG. 3. A rate center is a uniquely defined geographical area within an exchange area used for determining mileage measurements for the application of interstate tariffs.

Figure 1:
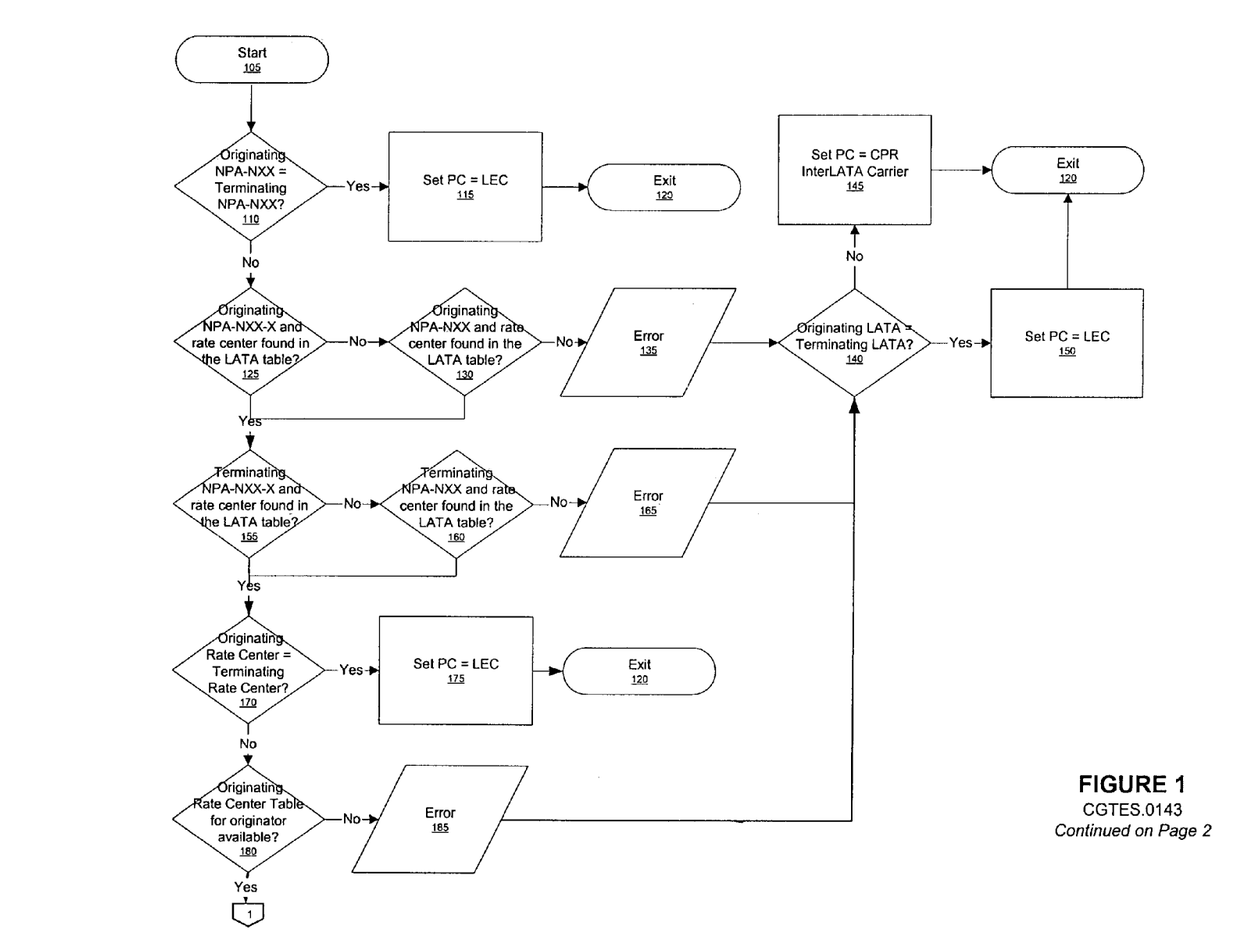
FIGS. 1 and 2 are collectively a flow chart in accordance with an embodiment of the invention.
Figure 2:
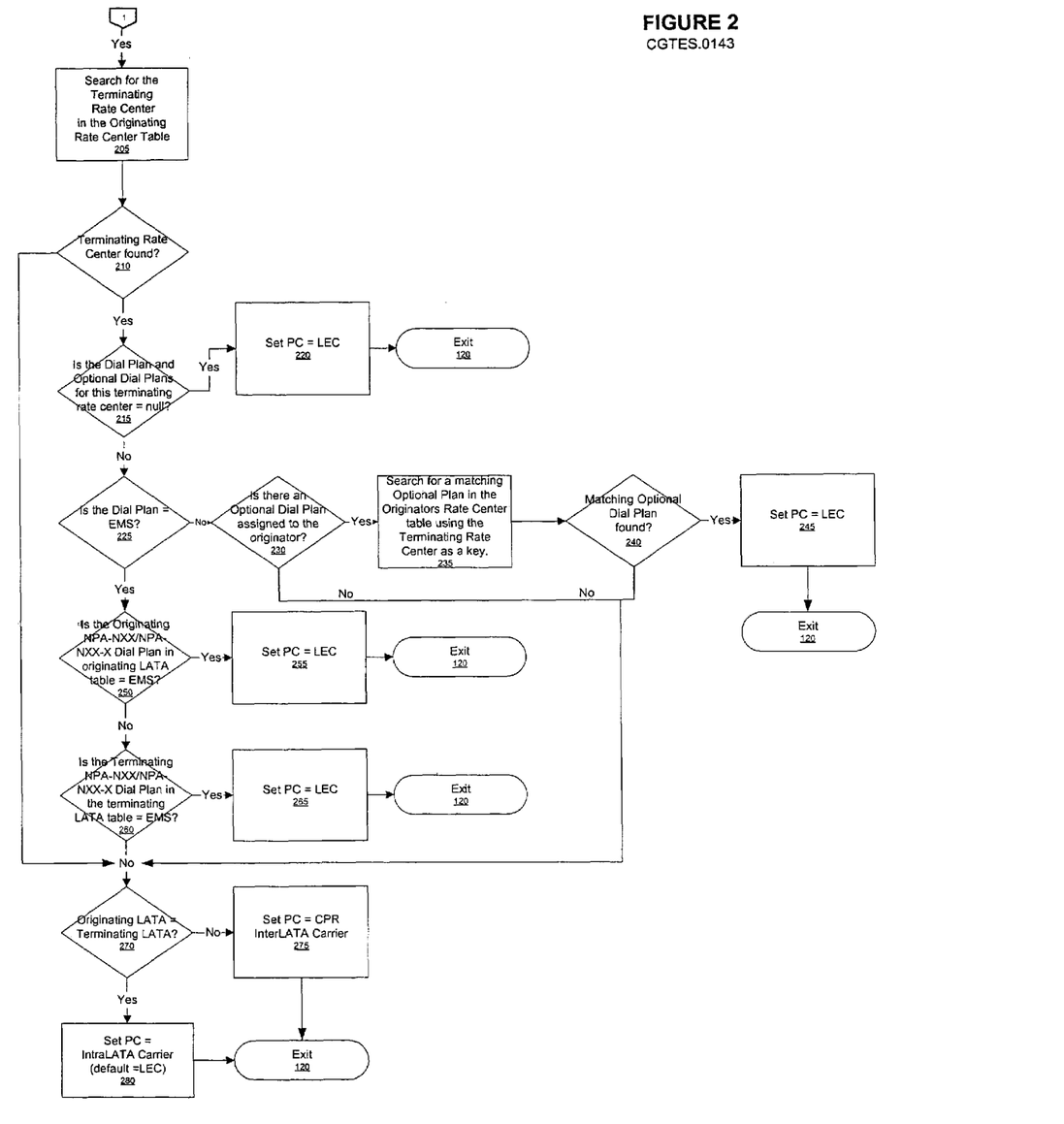

Referring now to FIGS. 1 and 2, a flow chart of an embodiment of the invention is illustrated. When an AIN call is made to an SSP, a query is launched by the SSP serving the call to the SCP, thereby invoking a service logic program (SLP). A carrier determination module within this service logic program determines how a particular AIN call should be routed. FIGS. 1 and 2 represent the logical flow of the carrier determination module for determining which type of carrier should be used for routing the call, whether it be the Local Exchange Carrier (LEC), the IntraLATA carrier, or the InterLATA carrier. Before this module is invoked by the SLP, the orginating telephone number and the terminating telephone number are collected from the SSP by the SCP. The originating and terminating LATA's are determined based on the originating and terminating NPA-NXX, respectively. The AIN SLP will not use this information until a determination has been made that this is not a local call. After the carrier determination module is invoked (step 105), the originating NPA-NXX is compared with the terminating NPA-NXX as reflected in step 110. If these numbers are equivalent, then the primary carrier for the call is set to the local exchange carrier as reflected in step 115. The reason for this is that when the NPA-NXX are equivalent for both the originating number and the terminating number, then by definition, the call is a local call and should be routed by the local exchange carrier. Thus, the program exits (step 120) and the SCP instructs the SSP to route the call using the local exchange carrier.

If the originating NPA-NXX and the terminating NPA-NXX are not the same at step 110, then a search of the LATA Table is performed to determine whether the originating NPA-NXX-X and an associated rate center are in the LATA Table (step 125). This search will only be successful when 1K Number Pooling is being used with the originating rate center. If the search is unsuccessful, then a search is made to determine whether the originating NPA-NXX and an associated rate center are in the LATA Table (step 130). If the originating NPA-NXX and rate center are also not found in the LATA Table, then an error is logged (step 135) because a matching record was not found in the LATA Table. Such an error may occur if the LATA table is not available or if the rate center for the associated NPA-NXX code is not provisioned in the LATA table.

When a matching record for the originating NPA-NXX is not found in the LATA Table at step 130, the originating LATA is compared to the terminating LATA (step 140). If the originating LATA, i.e. the LATA within which the call originated, is equal to the terminating LATA, i.e. the LATA within which the call is terminated, then the primary carrier is set to the local exchange carrier (step 150) and the module exits (step 120). However, if the originating LATA is not equal to the terminating LATA at step 140, then the primary carrier is set to the InterLATA carrier that is assigned to the customer with the AIN trigger that resulted in the service logic program being invoked (step 145). The IntraLATA carrier for the customer is derived from the Call Processing Record (CPR) for the AIN customer, i.e. the database that contains information regarding the customer with AIN service, and the module exits (step 120).

If the originating NPA-NXX-X and rate center are found in the LATA Table at step 125 or if the originating NPA-NXX and rate center are found in the LATA Table at step 130, then a determination is made as to whether the terminating NPA-NXX-X and rate center are found in the LATA Table (step 155). If the terminating NPA-NXX-X and rate center are not found in the LATA Table at step 155, then a query is made to determine if the terminating NPA-NXX and rate center are found in the LATA Table (step 160). If the terminating NPA-NXX-X/NPA-NXX and associated rate center cannot be located in the identified LATA Table or if the LATA Table does not exist then an error is logged (step 165).

When a matching record for the terminating NPA-NXX is not found in the LATA Table at step 160, the originating LATA is compared to the terminating LATA (step 140) using LATA information that is passed to the service logic program. If the originating LATA is the same as the terminating LATA, then the primary carrier is set to the local exchange carrier (step 150) and the module exits (step 120). However, if the originating LATA is not equal to the terminating LATA at step 140, then the primary carrier is set to the InterLATA carrier that is assigned customer with the AIN trigger that resulted in the service logic program being invoked (step 145). The InterLATA carrier is derived from the Call Processing Record (CPR) for the AIN customer. Then the module exits (step 120).

If the terminating NPA-NXX-X/NPA-NXX and associated rate center are found at step 155 or step 160, then the rate center in the LATA Table for the originating NPA-NXX or NPA-NXX-X is compared to the rate center in the LATA Table for the terminating NPA-NXX or NPA-NXX-X (step 170). If the rate centers are the same, then the primary carrier is set to the local exchange carrier (step 175) and the module exits (step 120). However, if the originating rate center is not the same as the terminating rate center at step 170, then a search is made to determine if the Originating Rate Center Table for the originator is available (step 180). The Originating Rate Center Table is a table containing information specific to that rate center such as the terminating rate centers within the local calling scope of that originating rate center. This table is described in greater detail below in reference to FIG. 4. If no Originating Rate Center Table is available at step 180, then an error message is logged (step 185).

If an Originating Rate Center Table is not found at step 180, the originating LATA value is compared with the terminating LATA value (step 140). If the originating LATA is the same as the terminating LATA, then the primary carrier is set to the local exchange carrier (step 150) and the module exits (step 120). However, if the originating LATA is not equal to the terminating LATA at step 140, then the primary carrier is set to the InterLATA carrier that is assigned to the AIN customer (step 145). This information is derived from the Call Processing Record (CPR) for the AIN customer. Then the module exits (step 120).

However, if an Originating Rate Center Table for the originator is found at step 180, then a search for the terminating rate center within the Originating Rate Center Table is made (step 205). All rate centers to which a local call may be made from the originating rate center are identified in the Originating Rate Center Table as defined below in reference to FIG. 4. If the terminating rate center is not found within the Originating Rate Center Table (step 210), then the originating LATA value is compared with the terminating LATA value (step 270). If the originating and terminating LATA values are equal, then the primary carrier value is set to the IntraLATA carrier assigned to the AIN customer if an IntraLATA carrier has been assigned or to the local exchange carrier if an IntraLATA carrier has not been assigned (step 280). The local exchange carrier is the default IntraLATA carrier unless the customer has specified another carrier for IntraLATA toll calls. The module then exits (step 120). If the originating and terminating LATAs are not the same at step 270, then the primary carrier value is set to the InterLATA carrier for the AIN customer (step 275) and the module exits (step 120).

If the terminating rate center is found in the Originating Rate Center Table at step 210, then a check of the Originating Rate Center Table is made to determine whether there are any dial plans associated with the terminating rate center (step 215). If there are no dial plans associated with the terminating rate center, i.e. the dial plan entries in the Originating Rate Center Table are null for that particular terminating rate center, then the primary carrier is set to the local exchange carrier (step 220) and the module exits (step 120). However, if the dial plan entries are not null at step 215, this means that the dial plan must be in effect for the call to be a local one. First, a determination is made as to whether the dial plan associated with the terminating rate center is an Extended Metro Service (EMS). If the dial plan associated with the terminating rate center is not an EMS at step 225, then it is determined whether an optional dial plan is assigned to the originator (step 230). If there is an optional dial plan assigned to the originator at step 230, then a comparison of the originator's optional plan to the Originating Rate Center Table optional dial plan value assigned to the applicable terminating rate center is made (step 235). If the optional dial plan value assigned to the applicable terminating rate center matches the optional dial plan for the originating rate center (step 240), then the primary carrier is set to the local exchange carrier (step 245) and the module exits 120. However, if no matching optional dial plan is found at step 240 or if there is no optional dial plan assigned to the originator at step 230, then the originating LATA value is compared to the terminating LATA value (step 270). If the originating and terminating LATA values are equal, then the primary carrier value is set to the IntraLATA carrier assigned to the AIN customer if an IntraLATA carrier has been assigned or to the local exchange carrier if an IntraLATA carrier has not been assigned (step 280). The module then exits (step 120). If the originating and terminating LATAs are not the same at step 270, then the primary carrier value is set to the InterLATA carrier for the AIN customer (step 275) and the module exits (step 120).

In the event that the dial plan entry in the Originating Rate Center Table for the terminating rate center is EMS at step 225, then the dial plan for the originating NPA-NXX or NPA-NXX-X (as the case may be) in the LATA Table is checked to determine if the dial plan for the originator is EMS (step 250). If the originating NPA-NXX/NPA-NXX-X dial plan is EMS then the primary carrier is set to the local exchange carrier (step 255) and the module exits (step 120). If the originating NPA-NXX/NPA-NXX-X dial plan is not EMS at step 250, then the dial plan for the terminating NPA-NXX/NPA-NXX-X is checked in the LATA table (step 260). If the terminating NPA-NXX/NPA-NXX-X dial plan in the terminating LATA Table is EMS at step 260, then the primary carrier is set to the local exchange carrier (step 265) and the module exits (step 120). Thus, if the dial plan in the Originating Rate Center Table associated with the terminating rate center is EMS, the call will always be a local call if either the originator or the called party has the EMS option.

However, if neither the originating number nor the terminating number have an EMS dial plan at step 260, then a comparison between the originating LATA value and the terminating LATA value is made (step 270). If the originating and terminating LATA values are equal, then the primary carrier value is set to the IntraLATA carrier assigned to the AIN customer if an IntraLATA carrier has been assigned or to the local exchange carrier if an IntraLATA carrier has not been assigned (step 280). The module then exits (step 120). If the originating and terminating LATAs are not the same at step 270, then the primary carrier value is set to the InterLATA carrier for the AIN customer (step 275) and the module exits (step 120).

Referring now to FIG. 3, an example of a LATA Table in accordance with the present invention is illustrated. This table is only illustrative of the table structure and is presented only for demonstration purposes. The actual data that would be inserted into the LATA Table must correspond with the actual values in existence. For example, one embodiment of the invention has a LATA Table which contains information regarding the North American Numbering Plan (NANP) in this table and each LATA within the NANP is defined. The service logic program will then use the originating/terminating LATA as a key to retrieve information from this table. If a matching LATA record cannot be found, the service logic will log an error as described above in reference to FIGS. 1 and 2. The Table shown in FIG. 3 is only a portion of the LATA Table that would actually be implemented in practice. For a plan that covers the United States or North America, the LATA Table would be very large and would contain information regarding every single LATA. However, in FIG. 3, only the LATA designated by the key number 552 is illustrated.

The LATA Table may be stored as an array in the SCP storage device such as in the MSAP database. The table is searchable by the LATA key and the NPA-NXX or NPA-NXX-X key. The LATA Table is divided into several columns. The first column is a LATA (key) identifier column 305 which has numerical identifiers that indicate which LATA a particular NPA-NXX/NPA-NXX-X is associated with. Each NPA-NXX combination within a LATA is also defined in the NPA-NXX or NPA-NXX-X column 310. To support 1K number pooling, the NPA-NXX combination must be expandable down to the thousandth level (NPA-NXX-X).

The service logic program used to retrieve information from this table performs the initial search based on the NPA-NXX-X values as described above in reference to FIG. 1. If a record cannot be found, the service logic will perform a subsequent search using the NPA-NXX value. The third column is the rate center column 315. The rate center assigned to each NPA-NXX or NPA-NXX-X (when applicable) combination must be defined in this table. For example, entry 325 in the LATA Table has NPA-NXX key of 817264 and is within the Arlington rate center.

Column four of the LATA Table is the dial plan column 320 which contains information regarding the Dial Plan for each NPA-NXX combination. For example, the 817264 combination in the Arlington rate center has the EMS dial plan. This dial plan, called the Extended Metro Service (EMS) plan, is used in the Dallas/Fort Worth and Houston, Tex. metropolitan areas and offers extended two-way local calling capabilities. All qualifying EMS calls are routed by the local exchange carrier. These numbers are also commonly referred to as "Metro" numbers.

Column five of the LATA Table is the Central Office Code (COC) type column 330. The COC type for each NPA-NXX/NPA-NXX-X combination may be defined in this table to provide additional information concerning the NPA-NXX or NPA-NXX-X combination that can be used by AIN service logic programs. A COC type is a three-position field defining the Central Office Code. For example, the COC type could be EOC which is the End Office Code. The COC type could also be PMC which refers to Public Mobile Carrier. Numerous other types of Central Office Codes may be used or implemented into the LATA Table without departing from the scope or spirit of the invention.

Column six of the LATA Table is the Originating Company Number (OCN) column 335. The OCN for each NPA-NXX or NPA-NXX-X combination must be defined. The OCN will provide additional information concerning the NPA-NXX or NPA-NXX-X that could be used by the AIN service logic programs. The four-position alphanumeric field is a simplified method for identifying an NPA-NXX or NPA-NXX-X code holder, switching entity, company, and non-facility based service provider such as resellers and billing service providers.

Figure 4:
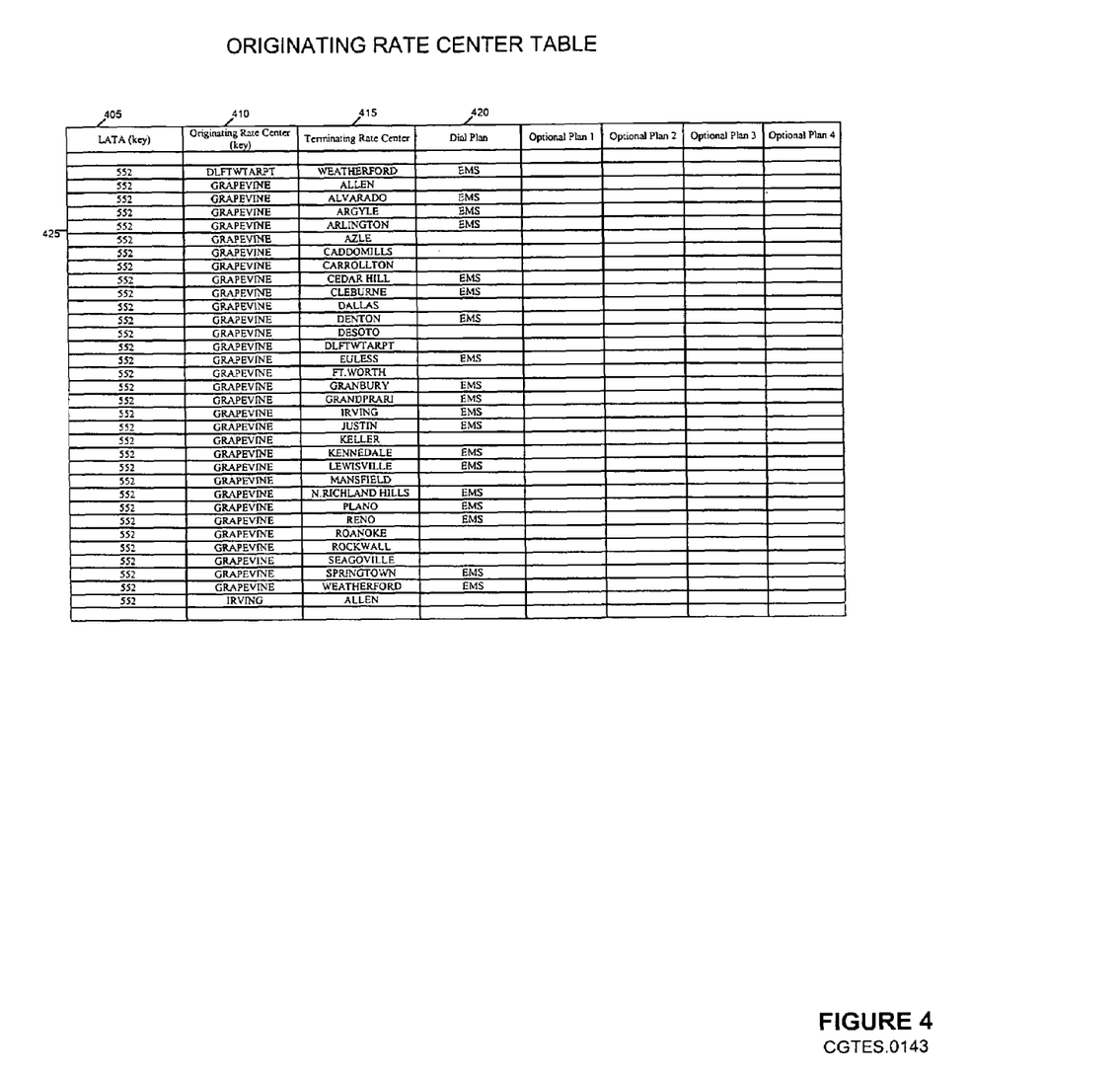
FIG. 4 is a hypothetical Originating Rate Center Table in accordance with an embodiment of the invention.

Referring now to FIG. 4, an example of an Originating Rate Center Table in accordance with the present invention is illustrated. In one embodiment, The Originating Rate Center Table contains the information specific to each rate center within the LATA where AIN services are provided. The Originating Rate Center Table provides existing and future AIN service logic programs with the information needed to determine when the call should be routed by the local exchange carrier. The table of FIG. 4 illustrates a table in which one single table is used to define all of the rate centers within one LATA. The table of FIG. 4 only illustrates or gives information for a portion of the originating rate centers within the hypothetical 552 LATA. The LATA key column 405 is used to index the originating rate center within an individual LATA. The LATA Table of FIG. 4 is an example that illustrates what a LATA Table for the Grapevine originating rate center would look like. The Originating Rate Center column 410 can also be used as a key to search the table.

Column three of the Originating Rate Center Table is the Terminating Rate Center column 415. Each terminating rate center that is within the local, extended area service, or extended local calling scope of the identifying originating rate center is recorded in this table. This information is then used to determine when the local exchange carrier should route the call. For example, the Grapevine originating rate center contains 31 different terminating rate centers starting with Allen and ending with Weatherford. The number of terminating rate centers that are within the local, extended area service, or extended local calling scope of an identified originating rate center determines the number of entries in this table for a particular originating rate center.

The Originating Rate Center Table also contains a column to indicate whether a particular dial plan is associated with the terminating rate center. Column four of the Originating Rate Center Table is the Dial Plan column 420. The dial plan associated with the terminating rate center is used to instruct the service logic program to use the dial plan associated with the originating and/or terminating NPA-NXX/NPA-NXX-X that is defined in the LATA Table of FIG. 3. In the Dial Plan column 420, the Extended Metro Service (EMS) dial plan is implemented. The entry in the Dial Plan column 420 is populated with "EMS" if an originating or terminating EMS code is required to complete the call on a local basis.

Columns five, six, seven and eight of FIG. 4 allow for the assignment of optional dial plans to each terminating rate center. Local service providers may offer originating based extended local calling plans. In this embodiment, up to four different optional dial plans can be assigned to each terminating rate center using the originating Rate Center Table of FIG. 4. AIN customers who have an optional dial plan will have a unique identifier positioned within their AIN call processing record (CPR). The applicable AIN service logic compares this optional dial plan identifier associated with the CPR to the optional dial plan that is assigned to the terminating rate center, if any. If a match is found, then the service logic will route the call using the local exchange carrier.

Referring to the table entries of FIG. 3 and FIG. 4, an illustration of the operation of the invention may be made. If a call is made from an NPA-NXX number "817251" to a terminating NPA-NXX number of "817307," then the LATA Table will be searched and it will be determined that both of these NPA-NXX numbers are contained within the LATA Table at rows 340 and 345, respectively. The Originating Rate Center Table for the 552 LATA will be accessed in FIG. 4 to determine that there is an Originating Rate Center Table for the Grapevine originating rate center. A search is made of all of the rows having Grapevine as an originating rate center to determine if the Arlington Rate Center is listed as a terminating rate center. A search of the table of FIG. 4 indicates that Arlington is indeed listed as a terminating rate center for Grapevine at row 425. However, the Dial Plan column is populated with "EMS." Thus, in order to route the call as a local call, either the originating NPA-NXX number or the terminating NPA-NXX number must have an EMS dial plan in the LATA Table of FIG. 3. However, neither "817251" nor "817307" have an extended dial plan. Therefore, the next question is whether the originating LATA is the same as the terminating LATA. In this case, both the originating LATA and the terminating LATA is "552" and therefore the primary carrier is set to the IntraLATA carrier for the AIN customer. If there is no IntraLATA carrier assigned, then the local exchange carrier is used to route the call. If the call had been made to a "817272" number in Arlington, then the call would automatically be routed by the local exchange carrier because row 350 in the LATA Table has the Dial Plan populated with "EMS."

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method for selecting a carrier type for routing a call for AIN-based customers of the LEC, said method comprising the following steps in the order given:

determining whether a called party is inside a local calling scope of a calling party;

responsive to a determination that said called party is inside said local calling scope of said calling party, selecting a first carrier as said carrier type; and, responsive to a determination that said called party is outside said local calling scope of said calling party, selecting a second carrier as said carrier type if an originating LATA of said calling party and a terminating LATA of said called party are the same and selecting a third carrier as said carrier type if said originating LATA and said terminating LATA are different.

2. The method of claim 1 wherein said step of determining whether a called party is inside said local calling scope of a calling party comprises:

determining an originating rate center and a terminating rate center by performing a lookup in a LATA table using a calling party number and a called party number; and searching for said terminating rate center in an originating rate center table.

3. The method of claim 2 wherein if said terminating rate center is found in said originating rate center table and an extended dial plan entry in said table is null for said terminating rate center, said called party is inside said local calling scope.

4. The method of claim 3 wherein if said terminating rate center is found in said originating rate center table and said extended dial plan entry in said table indicates that an extended dial plan is required for said terminating rate center, said called party is inside said local calling scope only if either said called party or said calling party subscribes to said extended dial plan.

5. The method of claim 2 wherein said lookup is performed using a key chosen from the group consisting of a NPA-NXX-X combination and a NPA-NXX combination.

6. The method of claim 2 wherein said lookup of said originating rate center is performed using said calling party number and wherein said lookup of said terminating rate center is performed using said called party number.

7. The method of claim 1 wherein said determination that said called party is inside said local calling scope of said calling party is made when said terminating rate center is found in an originating rate center table for said originating rate center.

8. The method of claim 1 wherein said determination that said called party is inside said local calling scope of said calling party is made when said terminating rate center is found in an originating rate center table for said originating rate center and an extended dial plan requirement indicated in said originating rate center table for said terminating rate center is satisfied.

9. The method of claim 1 wherein said originating LATA and said terminating LATA are the same when a lookup in a LATA table using a calling party number and a called party number indicates that an originating LATA key and a terminating LATA key are equal.

10. The method of claim 1 further comprising:

comparing an originating NPA-NXX to a terminating NPA-NXX prior to determining whether a called party is inside a local calling scope of a calling party; and responsive to a determination that said originating NPA-NXX and said terminating NPA-NXX are the same, selecting a local exchange carrier as said carrier type.

11. A method for determining a carrier type for routing a call for AIN-based customers of the LEC, said method comprising the following steps in the order given:

comparing an originating NPA-NXX to a terminating NPA-NXX;

responsive to a determination that said originating NPA-NXX and said terminating NPA-NXX are the same, selecting a local exchange carrier as said carrier type;

responsive to a determination that said originating NPA-NXX and said terminating NPA-NXX are different, determining an originating rate center for a calling party and a terminating rate center for a called party;

responsive to a determination that said terminating rate center and said originating rate center are the same, selecting a local exchange carrier as said carrier type;

responsive to a determination that said terminating rate center and said originating rate center are different, searching an originating rate center table for said terminating rate center;

responsive to finding said terminating rate center in said originating rate center table, determining whether said terminating rate center requires an extended dial plan to make a local call from said originating rate center to said terminating rate center;

responsive to a determination that said extended dial plan is required, selecting said local exchange carrier as said carrier type if either said calling party or said called party subscribe to said dial plan, and if neither said calling party nor said called party subscribe to said dial plan, selecting an IntraLATA carrier as said carrier type if an originating LATA is the same as a terminating LATA and selecting an InterLATA carrier if said originating LATA is different from said terminating LATA;

responsive to a determination that said extended dial plan is not required, selecting a local exchange carrier as said carrier type; and responsive to not finding said terminating rate center in said originating rate center table, selecting said IntraLATA carrier as said carrier type if said originating LATA is the same as said terminating LATA and selecting said InterLATA carrier as said carrier type if said originating LATA is different from said terminating LATA.

12. A data processing system for selecting a carrier type for routing a call for AIN-based customers of the LEC comprising:

means for determining whether a called party is inside a local calling scope of a calling party;

means, responsive to operation of said determining means providing a determination that said called party is inside said local calling scope of said calling party, for selecting a first carrier as said carrier type; and means, responsive to operation of said determining means providing a determination that said called party is outside said local calling scope of said calling party, for selecting a second carrier as said carrier type if an originating LATA of said calling party and a terminating LATA of said called party are the same and selecting a third carrier as said carrier type if said originating LATA and said terminating LATA are different.

13. The data processing system of claim 12 wherein said means for determining whether a called party is inside said local calling scope of a calling party comprises:

means for determining an originating rate center and a terminating rate center by performing a lookup in a LATA table using a calling party number and a called party number; and means for searching for said terminating rate center in an originating rate center table.

14. The data processing system of claim 13 wherein if said terminating rate center is found in said originating rate center table and an extended dial plan entry in said table is null for said terminating rate center, said called party is inside said local calling scope.

15. The data processing system of claim 14 wherein if said terminating rate center is found in said originating rate center table and said extended dial plan entry in said table indicates that an extended dial plan is required for said terminating rate center, said called party is inside said local calling scope only if either said called party or said calling party subscribes to said extended dial plan.

16. The data processing system of claim 13 wherein said lookup is performed using a key chosen from the group consisting of a NPA-NXX-X combination and a NPA-NXX combination.

17. The data processing system of claim 13 wherein said lookup of said originating rate center is performed using said calling party number and wherein said lookup of said terminating rate center is performed using said called party number.

18. The data processing system of claim 12 wherein said determination that said called party is inside said local calling scope of said calling party is made when said terminating rate center is found in an originating rate center table for said originating rate center.

19. The data processing system of claim 12 wherein said determination that said called party is inside said local calling scope of said calling party is made when said terminating rate center is found in an originating rate center table for said originating rate center and an extended dial plan requirement indicated in said originating rate center table for said terminating rate center is satisfied.

20. The data processing system of claim 12 wherein said originating LATA and said terminating LATA are the same when a lookup in a LATA table using a calling party number and a called party number indicates that an originating LATA key and a terminating LATA key are equal.

21. The data processing system of claim 12 further comprising:
   means for comparing an originating NPA-NXX to a terminating NPA-NXX prior to determining whether a called party is inside a local calling scope of a calling party; and
   means, responsive to a determination that said originating NPA-NXX and said terminating NPA-NXX are the same, for selecting a local exchange carrier as said carrier type.

22. A computer program product in a computer readable medium for selecting a carrier type for routing a call for AIN-based customers of the LEC, said computer program product comprising:
   first instructions for determining whether a called party is inside a local calling scope of a calling party;
   second instructions, responsive to said first instructions providing a determination that said called party is inside said local calling scope of said calling party, for selecting a first carrier as said carrier type; and,
   third instructions, responsive to said first instructions providing a determination that said called party is outside said local calling scope of said calling party, for selecting a second carrier as said carrier type if an originating LATA of said calling party and a terminating LATA of said called party are the same and selecting a third carrier as said carrier type if said originating LATA and said terminating LATA are different.

23. The computer program product of claim 22 wherein said first instructions comprises:
   instructions for determining an originating rate center and a terminating rate center by performing a lookup in a LATA table using a calling party number and a called party number; and
   instructions for searching for said terminating rate center in an originating rate center table.

24. A computer program product in a computer readable medium for determining a carrier type for routing a call for AIN-based customers of the LEC, said computer program product comprising:
   first instructions for comparing an originating NPA-NXX to a terminating NPA-NXX;
   second instructions, responsive to said first instructions providing a determination that said originating NPA-NXX and said terminating NPA-NXX are the same, for selecting a local exchange carrier as said carrier type;
   third instructions, responsive to said first instructions providing a determination that said originating NPA-NXX and said terminating NPA-NXX are different, for determining an originating rate center for a calling party and a terminating rate center for a called party;
   fourth instructions, responsive to a determination that said terminating rate center and said originating rate center are the same, for selecting a local exchange carrier as said carrier type;
   fifth instructions, responsive to a determination that said terminating rate center and said originating rate center are different, for searching an originating rate center table for said terminating rate center;
   sixth instructions, responsive to finding said terminating rate center in said originating rate center table, for determining whether said terminating rate center requires an extended dial plan to make a local call from said originating rate center to said terminating rate center;
   seventh instructions, responsive to a determination that said extended dial plan is required, for selecting said local exchange carrier as said carrier type if either said calling party or said called party subscribe to said dial plan, and if neither said calling party nor said called party subscribe to said dial plan, selecting an IntraLATA carrier as said carrier type if an originating LATA is the same as a terminating LATA and selecting an InterLATA carrier if said originating LATA is different from said terminating LATA;
   eighth instructions, responsive to a determination that said extended dial plan is not required, for selecting a local exchange carrier as said carrier type; and
   ninth instructions, responsive to not finding said terminating rate center in said originating rate center table, for selecting said IntraLATA carrier as said carrier type if said originating LATA is the same as said terminating LATA and selecting said InterLATA carrier as said carrier type if said originating LATA is different from said terminating LATA.

* * * * *